Aug. 1, 1944.   E. F. FISHER   2,354,678
GAS CLEANER AND WASHER
Filed June 1, 1942   2 Sheets-Sheet 1

Aug. 1, 1944. E. F. FISHER 2,354,678
GAS CLEANER AND WASHER
Filed June 1, 1942 2 Sheets-Sheet 2
Fig. 2.
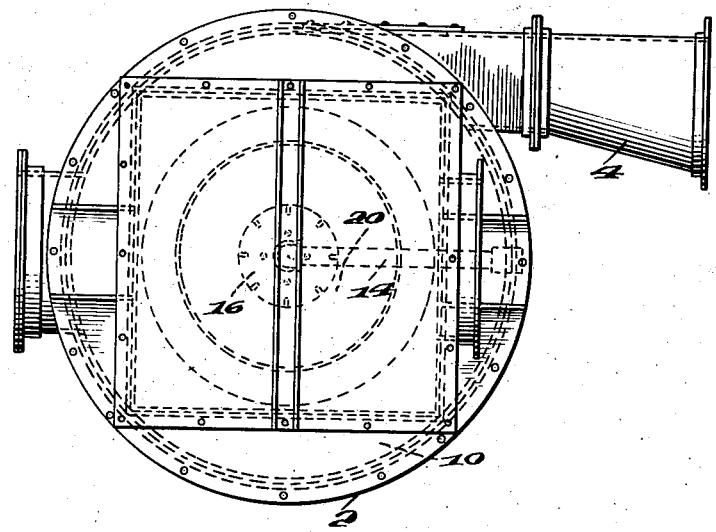
Fig. 3.
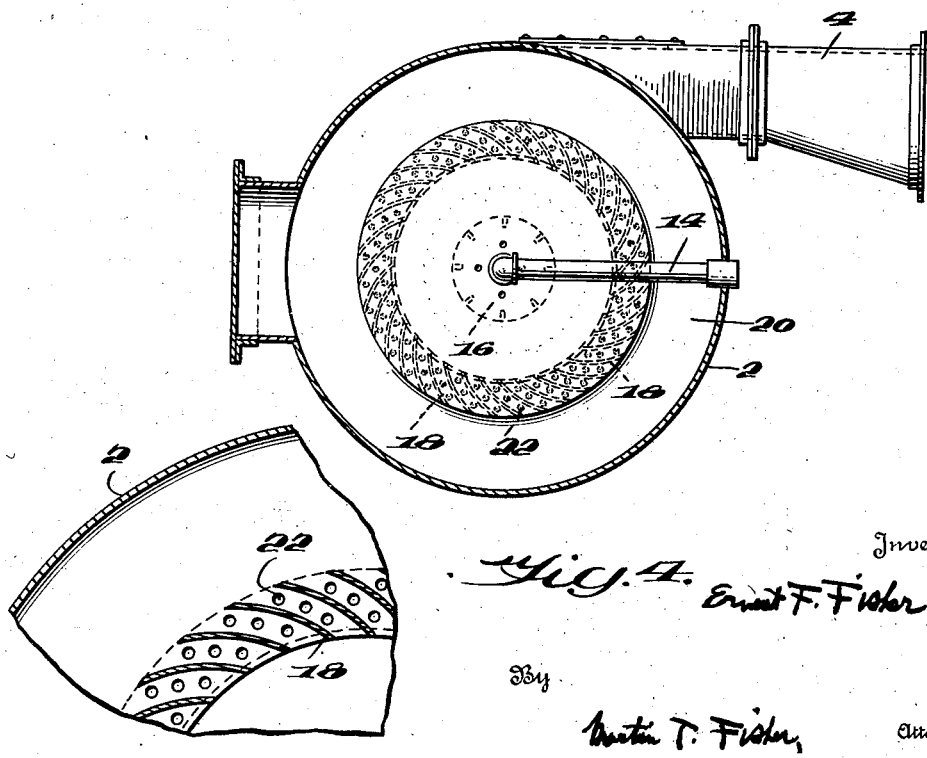
Fig. 4.
Inventor
Ernest F. Fisher,
By
Martin T. Fisher,
Attorney.

Patented Aug. 1, 1944

2,354,678

UNITED STATES PATENT OFFICE 2,354,678

GAS CLEANER AND WASHER

Ernest F. Fisher, Boston, Mass.

Application June 1, 1942, Serial No. 445,325

4 Claims. (Cl. 183—25)

This invention is a cleaner for air and gas, of the type utilizing centrifugal force and wetting of the impurities in the gas, for cleaning it of dust and other impurities.

The apparatus of the present invention has certain features similar to those shown in my application Serial Number 444,583, filed May 26, 1942 and my application Serial Number 445,324, filed June 1, 1942.

The gas being cleaned is usually dust laden air and the liquid used is usually water, and the invention will be so described, although it is not to be limited to the cleaning of air or to the use of water as the cleaning liquid.

According to the present invention, the cleaner comprises a vertically disposed casing having positioned centrally therein a large vertical open-ended tube. Dust laden air from a tangential air inlet comes into the casing and passes upwardly through the tube and outwardly through swirling vanes just above the top of the tube, a strong spray or stream of water or other cleaning liquid being directed through the vanes into intimate contact with the air passing therethrough. A baffle ring is provided at about the level of the upper end of the open-ended tube, the swirling vanes being positioned between a disc baffle, centrally positioned above the open end of the tube, and the inner edge of this baffle ring.

The principal feature of the present invention is that the inner portion of the baffle ring is provided with holes in the zone adjacent the lower edges of the swirling vanes; due to a slight excess air pressure which exists below the baffle ring, air is bubbled upwardly through these holes into the water collected by the baffle ring. The air and water travelling laterally through the swirling vanes exerts a shearing action on the bubbles of air coming through these holes in the baffle ring, and this shearing action, plus the turbulence due to the bubbling up of the air, mixes the dust and water, and results in wetting it thoroughly, and so results in more efficient cleaning thereof. Some water may drop through the holes into the swirling air from the tangential inlet and wet such air.

The invention will be described in more detail with reference to the accompanying drawings, in which:

Fig. 2 is a top plan view of Fig. 1;

Fig. 3 is a section on the line 3—3 of Fig. 1; and

Fig. 4 is an enlarged fragmentary section in plan of the swirling vanes and associated parts.

Figure 1:
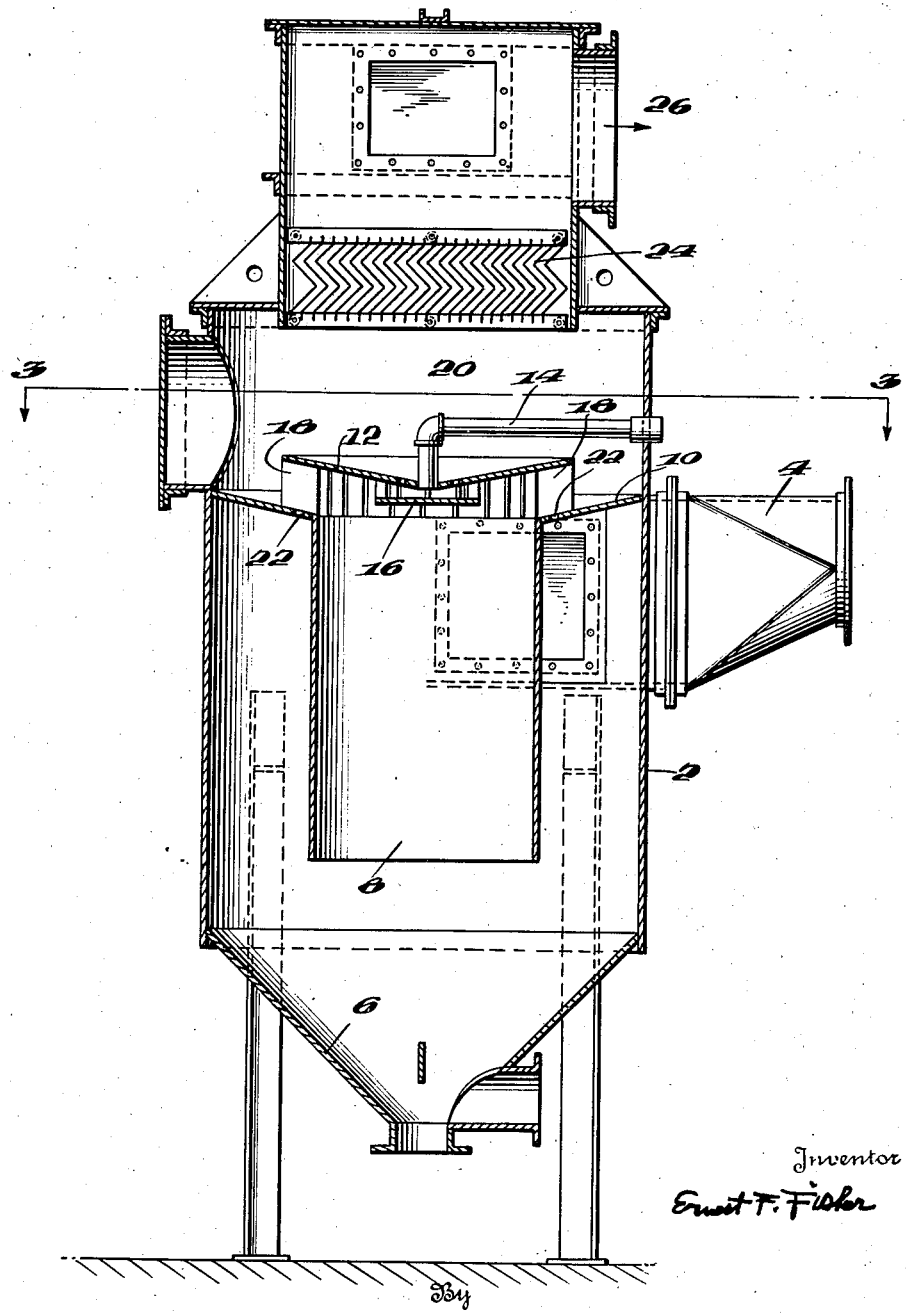
Fig. 1 is a vertical sectional view through the apparatus of the present invention.

Referring now to these drawings, a vertically positioned casing 2 is provided with a tangential air inlet 4 and with a conical bottom 6 for collecting liquid and sludge.

Positioned centrally and vertically in the casing is a large open-ended tube 8. At the upper end of the tube 8 a downwardly and inwardly inclined baffle ring 10 is positioned, its outer edge engaging the inner wall of the casing 2, while its inner edge engages the upper edge of the tube 8.

Positioned centrally and above the open end of the tube 8 is a disc baffle 12, through the center of which a water inlet pipe 14 delivers water against a deflecting plate 16 for deflecting the water laterally and radially in all directions.

Positioned between the outer portion of the disc baffle 12 and the inner portion of the baffle ring 10 is a plurality of vertically and angularly positioned swirling vanes 18, the purpose of which is to give any air or liquid passing therethrough a rotary motion into the chamber 20.

Coming now to the most important feature of the present invention, the inner portion of the baffle ring 10 is provided with a number of holes 22, located between the lower edges of the swirling vanes 18.

The operation of the apparatus is as follows: Dust laden air coming in through the tangential inlet 4 whirls around in the casing 2 and passes upwardly in the tube 8. The air is deflected laterally and radially in all directions by the baffle 12 into and through the swirling vanes 18 where it is wetted by the water spray from the plate 16.

The water thrown into the chamber 20 is collected by the baffle ring 10 and drains inwardly, flowing across the holes 22 and then downwardly on the inside of the tube 8, keeping such inside wall wet and clear of accumulated dust. As the water flows across the holes 22, air is bubbled upwardly through these holes into this layer of water, due to the slight excess air pressure existing just below the baffle ring 10. The laterally and radially travelling air and water passing through the vanes 18 exerts a shearing action on these air bubbles; the bubbling action creates turbulence; the result of this shearing and bubbling action is that the dust particles are thoroughly mixed with the water and thoroughly wetted and therefore efficiently cleaned. The cleaned air passes upwardly through a mist collector 24 and out through the clean air duct 26. Some water may drop through the holes 22 into the swirling, dust laden air therebelow and so aids in wetting and cleaning it.

While the invention has been described in considerable detail, it is not to be limited to the exact details shown, but may be carried out in other ways.

I claim as my invention:

1. An air cleaner, comprising in combination a vertical casing, a large tube vertically positioned therein, a tangential air inlet for said casing, a baffle ring positioned between the upper part of said tube and the inner wall of the casing, a disc baffle larger than the opening in the baffle ring so as to overlap a portion thereof, swirling vanes positioned between the overlapping portions of the disc baffle and the baffle ring, means for projecting liquid laterally through the swirling vanes, the baffle ring being provided with holes therein, located between the lower edges of the swirling vanes, said holes opening into the tangential air inlet chamber, through which holes air is passed upwardly into the laterally travelling air and water thereabove.

2. An air cleaner, comprising in combination a vertical casing, a large tube vertically positioned therein, a tangential air inlet for said casing, a baffle ring positioned between the upper part of said tube and the inner wall of the casing, a disc baffle larger than the opening in the baffle ring so as to overlap a portion thereof, swirling vanes positioned between the overlapping portions of the disc baffle and the baffle ring, means for projecting liquid laterally through the swirling vanes, the baffle ring being provided with holes therein, opening into the tangential air inlet chamber, said holes being located in the same zone as and between the lower edges of the swirling vanes, whereby air is bubbled upwardly through said holes into the laterally moving liquid thereabove.

3. An air cleaner, comprising in combination a vertical casing, a large tube positioned centrally and vertically therein, an air inlet for said casing, a baffle ring positioned between the upper part of said tube and the inner wall of the casing, serving to create a slight excess pressure below it, a centrally positioned disc baffle above and overlapping the inner portion of the baffle ring, swirling vanes between the overlapping portions of the disc baffle and the baffle ring, means for projecting liquid laterally through the swirling vanes, the inner part of the baffle ring being provided with holes therein between the lower edges of the vanes, for allowing air to pass upwardly therethrough into the laterally travelling liquid thereabove, said holes opening into the air inlet chamber.

4. An air cleaner, comprising in combination a vertical casing, a large tube positioned centrally and vertically therein, an air inlet for said casing, an inwardly sloping baffle ring positioned between the upper part of said tube and the inner wall of the casing, serving to create a slight excess pressure below it, a centrally positioned disc baffle above the baffle ring, swirling vanes between the disc baffle and the baffle ring, a liquid distributing plate below the disc baffle for projecting liquid laterally through the swirling vanes, a pipe passing through the disc baffle for delivering liquid under pressure to said liquid distributing plate the inner part of the baffle ring being provided with holes therein, in the zone between the lower edges of the swirling vanes, for allowing air to pass upwardly therethrough into the laterally travelling liquid thereabove, said holes opening into the air inlet chamber.

ERNEST F. FISHER.